(12) United States Patent
Yamamoto

(10) Patent No.: US 7,008,060 B2
(45) Date of Patent: Mar. 7, 2006

(54) PROJECTOR OPTICAL SYSTEM AND PROJECTOR APPARATUS USING THE SAME

(75) Inventor: Chikara Yamamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/645,909

(22) Filed: Aug. 22, 2003

(65) Prior Publication Data

US 2004/0046941 A1 Mar. 11, 2004

(30) Foreign Application Priority Data

Sep. 9, 2002 (JP) ............................. 2002-262999

(51) Int. Cl.
*G03B 21/28* (2006.01)

(52) U.S. Cl. ........................... 353/33; 353/81; 348/771

(58) Field of Classification Search ............ 353/30–34, 353/20, 81; 348/771; G03B 21/28
See application file for complete search history.

(56) References Cited

U.S. PATENT DOCUMENTS

| | | | |
|---|---|---|---|
| 5,061,049 A * | 10/1991 | Hornbeck | 359/224 |
| 5,535,047 A * | 7/1996 | Hornbeck | 359/295 |
| 6,144,420 A * | 11/2000 | Jung | 349/8 |
| 6,412,949 B1 * | 7/2002 | Halldorsson | 353/8 |
| 6,582,080 B1 * | 6/2003 | Gibbon et al. | 353/20 |
| 6,672,722 B1 * | 1/2004 | O'Connor et al. | 353/34 |
| 6,726,332 B1 * | 4/2004 | Cannon et al. | 353/33 |
| 6,779,893 B1 * | 8/2004 | O'Connor et al. | 353/20 |
| 2002/0033903 A1 * | 3/2002 | Sato | 348/756 |
| 2003/0016335 A1 * | 1/2003 | Penn | 353/31 |

* cited by examiner

Primary Examiner—W. B. Perkey
Assistant Examiner—Andrew Sever
(74) Attorney, Agent, or Firm—Snider & Associates; Ronald R. Snider

(57) ABSTRACT

In a projector optical system comprising a digital micromirror device for modulating illumination light, a device having a polarization separating surface is provided for separating a luminous flux incident on the digital micromirror device and a luminous flux emitted from the digital micromirror device from each other. A device for rotating a polarization direction is disposed between the polarization separating surface and the digital micromirror device.

6 Claims, 6 Drawing Sheets

PROJECTOR OPTICAL SYSTEM AND PROJECTOR APPARATUS USING THE SAME

RELATED APPLICATIONS

This application claims the priority of Japanese Patent Application No. 2002-262999 filed on Sep. 9, 2002, which is incorporated herein by reference.

BACKGROUND OF THE INVENTION

1. Field of the Invention

The present invention relates to a projector optical system for projecting illumination light modulated by a light valve onto a screen under magnification; and, more specifically, to a projector optical system comprising a digital micromirror device mounted with a number of mirror elements with variable light-reflecting directions capable of changing the direction of reflection of irradiation light in response to video signals, so that only signal light can be reflected toward a projection optical system, and a projector apparatus using the same.

2. Description of the Prior Art

Recently, the market of projectors has been expanding because of their widespread use in presentations and needs for seeing pictures from DVD players and the like on larger screens. In particular, as the demand for high-definition images has been increasing, projector optical systems using micromirror devices (hereinafter referred to as "DMD") have been developed as a technique which drastically increases the number of pixels without enhancing the size of optical systems.

When making presentations by employing personal computers, projector apparatus are often used in bright spaces. Hence, there have been demands for developing projector apparatus which can yield sufficiently bright pictures even in such an environment.

For brightening an image projected from a projector apparatus, the output of a light source used therefor may be raised. However, raising the output of the light source not only increases the manufacturing cost but also requires measures against the heat generated from the light source, and shortens the life of the light source.

On the other hand, the effective F number of illumination optical systems may be made smaller, so as to carry out illumination efficiently, thereby brightening the image projected from the projector apparatus.

As such a projector optical system, examples of conventional projector optical systems using DMD will be explained with reference to drawings. FIG. 6 is a view showing the configuration of a major part of a projector optical system for separating an illumination luminous flux and a projection luminous flux from each other by using a total reflection prism. FIG. 7 is a sectional view showing the configuration of a projector optical system for separating an illumination luminous flux and a projection luminous flux from each other at a pupil position of a projection optical system.

In the conventional projector optical system for separating an illumination luminous flux and a projection luminous flux from each other by using a total reflection prism, as shown in FIG. 6, illumination light emitted from a light source (not depicted) is totally reflected by a total reflection surface 91 of a prism 90, so as to be made incident on a DMD 70. Then, the illumination light modulated by the DMD 70 enters a projection optical system (not depicted), so as to be projected onto a screen (not depicted). A cover glass sheet 71 is attached to the surface of the DMD 70.

As shown in FIG. 7, the conventional projector optical system for separating an illumination luminous flux and a projection luminous flux from each other at a pupil position of a projection optical system comprises a light source unit 10; an integrator optical system 20 constituted by a rod integrator 201 for homogenizing a luminous flux from the light source unit 10 and a pair of lenses 202, 203; a mirror 403; a pair of condenser lenses 401, 402; a DMD 70; and a projection optical system 80 including a plurality of lenses. A cover glass sheet 71 is attached to the surface of the DMD 70.

In this projector optical system, the condenser lens 401 is disposed near the pupil position of the projection optical system 80. The illumination luminous flux passes through the condenser lens 401 disposed near the pupil position whereas the projection luminous flux from the DMD 70 enters the inside of a frame (not depicted) of the projection optical system 80, whereby these luminous fluxes are separated from each other. Namely, the illumination light emitted from the light source unit 10 so as to become substantially parallel light is turned into a uniform luminous flux by the integrator optical system 20, which is reflected by the mirror 403 and then is collected by the condenser lenses 401, 402, so as to be made incident on the DMD 70. The illumination light modulated by the DMD 70 so as to carry image information enters the projection optical system 80 again by way of the field lens 402, so as to be projected onto a screen (not depicted).

However, in the projector optical systems using DMD, such as the optical system for separating the illumination luminous flux and the projection luminous flux from each other by using the total reflection prism and the projector optical system for separating the illumination luminous flux and the projection luminous flux from each other at the pupil position of the projection optical system, the effective F number and the rotation angle of a minute mirror element constituting the DMD have a close relationship therebetween, whereby the effective F number of the illumination optical system cannot be made smaller unless the angle of rotation of minute mirror elements constituting the DMD is changed. Also, the angle of rotation of minute mirror elements constituting the DMD is determined according to predetermined standards and thus cannot be changed easily.

The total reflection angle (indicated by A in FIG. 6) in the total reflection prism is determined by the total reflection condition and cannot be changed arbitrarily.

SUMMARY OF THE INVENTION

In view of such circumstances, it is an object of the present invention to provide a projector optical system using a DMD and a projector using this optical system, in which the effective F number of the illumination optical system can be lowered without changing the angle of rotation of minute mirror elements constituting the DMD, thereby yielding a bright optical system and making it possible to set directions of illumination and projection luminous fluxes arbitrarily.

For achieving the above-mentioned object, the present invention provides a projector optical system comprising:

a digital micromirror device for modulating illumination light, the digital micromirror device including minute mirror elements with variable light-reflecting directions, the minute mirror elements being arranged regularly within a plane so as to correspond to respective pixels of an image, each minute mirror element switching, according to a video signal fed therein, between two states having respective angles of rotation different from each other so as to selectively reflect the illumination light into one of first and second directions;

an illumination optical system for illuminating the digital micromirror device with a luminous flux having a uniform polarization direction;

a projection optical system for projecting onto a predetermined projection surface the luminous flux modulated by the digital micromirror device; and luminous flux separating means for making light from the illumination optical system incident on the digital micromirror device and guiding to the projection optical system the illumination light modulated by the digital micromirror device and emitted in the first direction;

wherein the luminous flux separating means has a polarization separating surface for separating a luminous flux incident on the digital micromirror device and a luminous flux emitted from the digital micromirror device from each other; and wherein polarization direction rotating means for rotating a polarization direction is disposed between the polarization separating surface and the digital micromirror device.

Preferably, the luminous flux separating means is a prism member.

The polarization direction rotating means may be constituted by a quarter-wave plate.

Preferably, the projection optical system is an optical system telecentric on a reducing magnification side.

The polarization separating surface may reflect S-polarized light incident thereon from the illumination optical system toward the digital micromirror device and transmit therethrough toward the projection optical system P-polarized light outputted from the polarization direction rotating means after being reflected in the first direction by the digital micromirror device.

The present invention provides a projector apparatus comprising the projector optical system.

DESCRIPTION OF THE PREFERRED EMBODIMENTS

Figure 1:
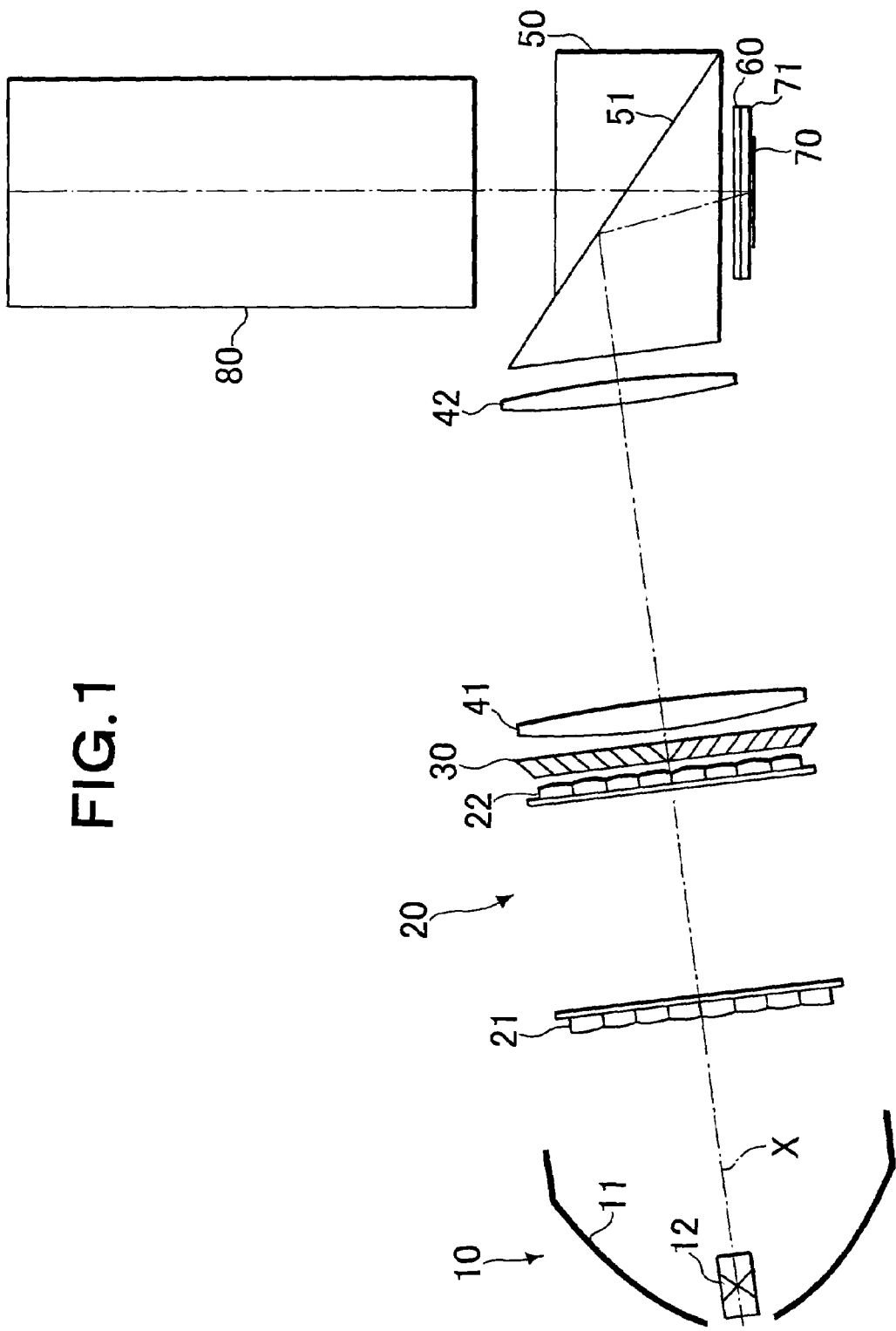
FIG. 1 is a sectional view showing the configuration of a projector optical system in accordance with Example 1 of the present invention.

In the following, embodiments of the projector optical system in accordance with the present invention and the projector apparatus using the same will be explained with reference to specific examples shown in the drawings.

EXAMPLE 1

Figure 2:
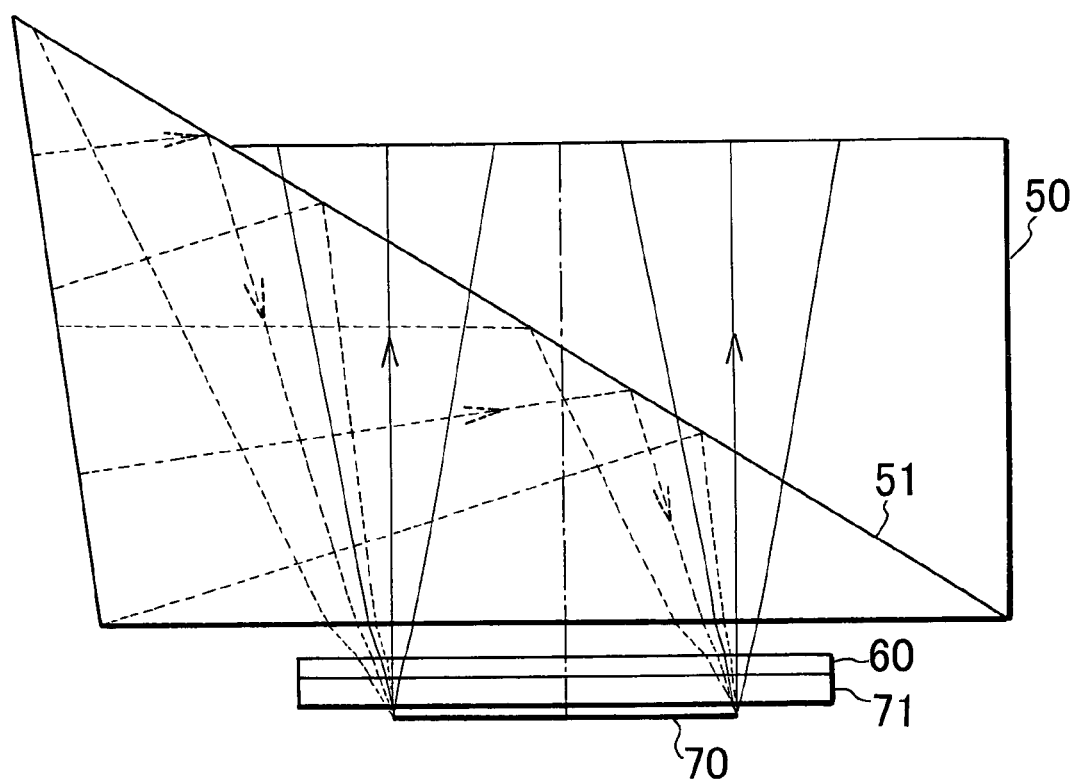
FIG. 2 is a view showing a major part of the projector optical system in accordance with Example 1 of the present invention.

FIG. 1 is a sectional view showing the configuration of a projector optical system in accordance with Example 1 of the present invention, whereas FIG. 2 is a view showing a major part of the projector optical system.

As shown in FIG. 1, the projector optical system in accordance with Example 1 of the present invention comprises a light source unit 10, an integrator optical system 20 for homogenizing the light quantity distribution within a luminous flux cross section, a polarization converter 30 for converting the luminous flux from the light source unit 10 into predetermined linearly polarized light, a pair of condenser lenses 41, 42 for converging the polarized light, a polarization separating prism 50 having a polarization separating surface 51, a quarter-wave plate 60, a DMD (digital micromirror device) 70, and a projection optical system 80 including a plurality of lenses.

The light source unit 10 comprises a parabolic reflector 11 and a light source lamp 12 disposed at a focal position thereof. Illumination light (white light) from the light source lamp 12 is reflected by the parabolic reflector 11 so as to become substantially parallel light, which is then made incident on the integrator optical system 20.

The integrator optical system 20 comprises a first lens array 21 and a second lens array 22. A plurality of convex lenses are arranged in a rectangular form on each of substrates of the lens arrays 21, 22. The convex lenses of the first lens array 21 and second lens array 22 have their corresponding surfaces opposite from each other, and are arranged at respective positions where the luminous flux from the light source lamp 12 efficiently irradiates the polarization converter 30 (a comb filter which will be explained later in detail) in a uniform fashion. The light incident on the first lens array 21 forms light source images by the number identical to that of the convex lenses within a plane perpendicular to the optical axis X under the action of the individual convex lenses, whereas the second lens array 22 is disposed near the light source images. The light collected by the second lens array 22 is made incident on the polarization converter 30 adjacent the second lens array 22.

The polarization converter 30 comprises a comb filter and, though not depicted in detail, includes a polarization separating surface and a half-wave plate for converting P-polarized light into S-polarized light, thereby arranging the illumination light from the light source unit 10 into S-polarized light. The illumination light arranged into S-polarized light by the comb filter is made incident on the polarization separating prism 50 by way of a pair of condenser prisms 41, 42.

As shown in FIG. 2, the polarization separating prism 50 has the polarization separating surface 51, whereas incident S-polarized light is reflected by the polarization separating surface 51 so as to be made incident on the DMD 70 by way of the quarter-wave plate 60. This S-polarized light is modulated and reflected by the DMD 70, and then passes through the quarter-wave plate 60 again, so as to be converted into P-polarized light, which is then made incident on the polarization separating prism 50. Thereafter, the modulated light turned into P-polarized light under the action of the quarter-wave plate 60 passes through the polarization separating surface 51. Therefore, the P-polarized light carrying desirable video information subsequently enters the projection optical system 80, so as to be projected onto a screen (not depicted).

Figure 4:
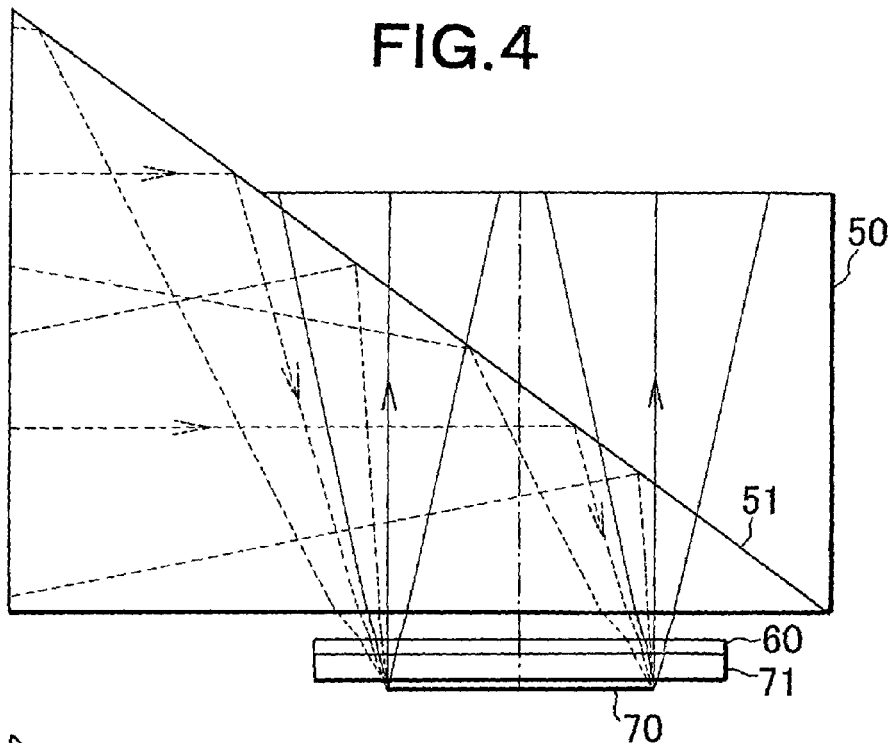
FIG. 4 is a view showing a major part of the projector optical system in accordance with Example 2 of the present invention.

In FIG. 2, broken lines indicate the S-polarized light incident on the polarization separating prism 50 and then reflected by the polarization separating prism 50 so as to reach the DMD 70, whereas solid lines indicate the P-polarized light modulated by the DMD 70 and then transmitted through the polarization separating surface 51 so as to reach the projection optical system 80 (ditto in FIG. 4).

The DMD 70 is a substantially planar device, and comprises a mirror surface in which a very large number of mirror elements having a similar configuration are regularly arranged within a plane (DMD surface), whereas the reflecting direction of each of the mirror elements constituting the mirror surface is independently switchable between two directions. The mirror elements correspond to respective pixels of an image, and take any of two different rotational angle states according to ON/OFF control of image signals fed into the mirror elements, thereby selectively reflecting the illumination light into any of first and second directions. A cover glass sheet 71 is attached to the surface of the DMD 70.

In this embodiment, the light reflected by mirror elements in their ON state is desirable modulated light, whereas the light reflected by mirror elements in their OFF state is emitted, for example, from side faces of the polarization separating prism 50 to the outside and is converted into heat by a light-absorbing plate or the like, which is not depicted, so as to be released.

The projection optical system 80 is an optical system telecentric on the reducing magnification side, thereby being able to prevent color and light quantity from becoming uneven.

Thus, in the projector optical system of Example 1, the illumination light emitted from the light source unit 10 along the optical axis X is caused to have a uniform light quantity distribution within a luminous flux cross section by the integrator optical system 20, and is turned into S-polarized light by the polarization converter 30, which is then converged by the condenser lenses 41, 42. Thus converged light is reflected by the polarization separating surface 51 of the polarization separating prism 50, and then is made incident on the DMD 70 with the polarization direction being rotated by 90° by the quarter-wave plate 60. In the DMD 70, each mirror element selectively reflects the illumination light into any of the first and second directions, so as to cause the light to carry video information. The resulting modulated light is transmitted through the quarter-wave plate 60 again, so as to rotate the polarization direction by 90°, thereby being converted into P-polarized light, which is then made incident on the polarization separating prism 50. In the polarization separating prism 50, the polarization separating surface 51 transmits the P-polarized light therethrough as mentioned above, whereby the modulated light carrying the desirable video information enters the projection optical system 80, so as to be projected onto a screen (not depicted).

In the projector optical system of Example 1, the illumination light modulated by the DMD 70 is separated in terms of polarization by the polarization separating surface 51 of the polarization separating prism 50. Therefore, as compared with the case using a total reflection prism, the range for setting the angle between the illumination and projection luminous fluxes becomes wider and increases its degree of freedom, whereby the F number of the illumination optical system can be made smaller without changing the rotational angle of minute mirror elements constituting the DMD 70. On the other hand, the polarization separating prism 50 can be made by bonding two prisms together at the polarization separating surface, whereby reliability improves in the optical path adjustment as compared with the prior art that forms a total reflection surface by way of an air gap.

EXAMPLE 2

Figure 3:
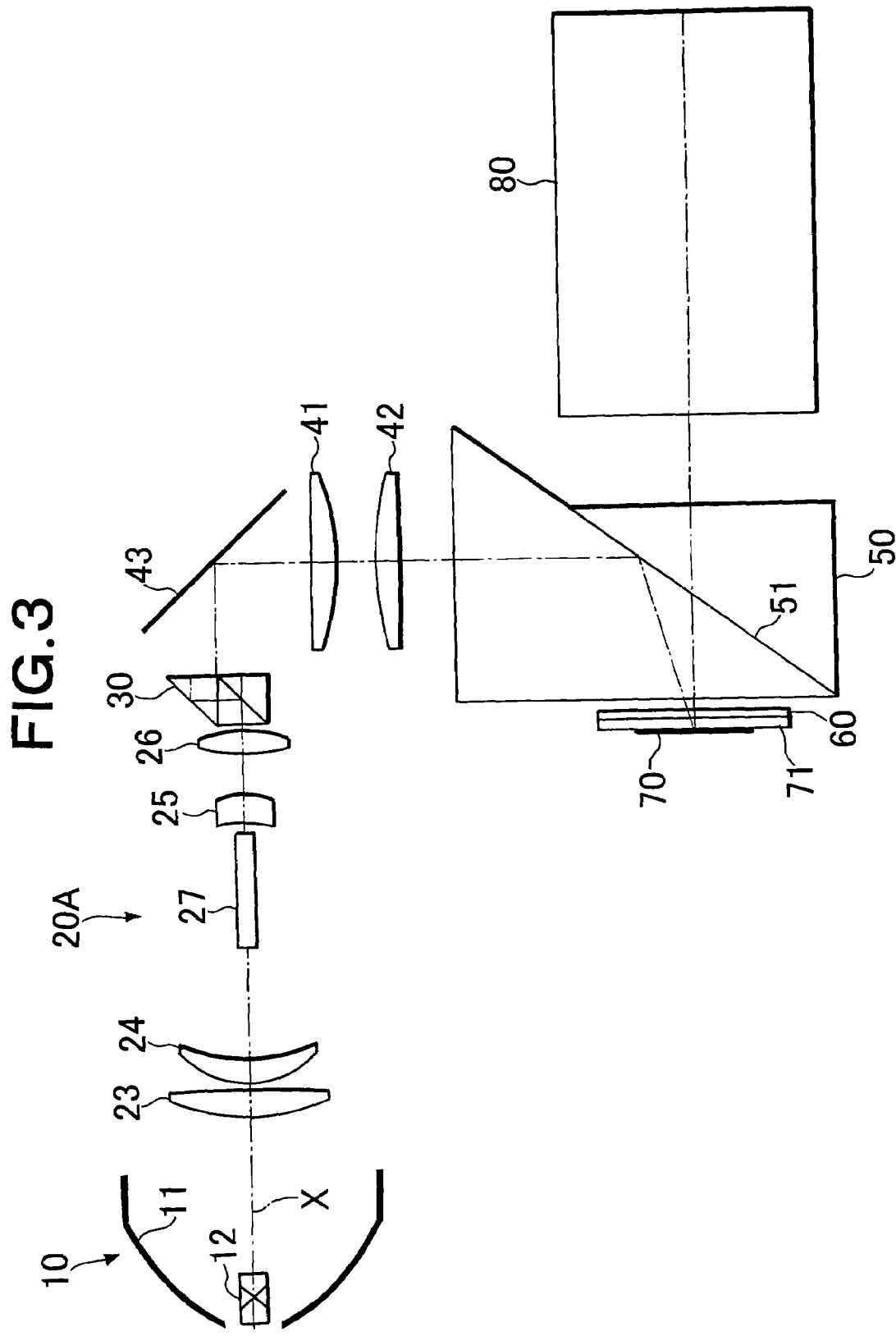
FIG. 3 is a sectional view showing the configuration of a projector optical system in accordance with Example 2 of the present invention.

FIG. 3 is a sectional view showing the configuration of a projector optical system in accordance with Example 2, whereas FIG. 4 is a view showing a major part of the projector optical system.

The projector optical system in accordance with Example 2 of the present invention has substantially the same configuration as that of Example 1 except for the setting of the angle between the illumination light and projection light in the polarization separating prism 50 and the configuration of the integrator optical system 20 and polarization converter 30. In the following, configurations different from those of Example 1 will be explained whereas constituents similar to those of Example 1 will be referred to with numerals identical thereto without repeating their detailed descriptions.

As shown in FIG. 3, the projector optical system in accordance with Example 2 comprises a light source unit 10, an integrator optical system 20A for homogenizing the light quantity distribution within a luminous flux cross section, a polarization converter 30 for converting a luminous flux from the light source unit 10 into predetermined linearly polarized light, a mirror 43 for reflecting the polarized light from the polarization converter 30, a pair of condenser lenses 41, 42 for converging the polarized light, a polarization separating prism 50 having a polarization separating surface 51, a quarter-wave plate 60, a DMD 70, and a projection optical system 80 including a plurality of lenses.

The light source unit 10 and the projection optical system 80 have configurations similar to those of Example 1. Namely, in the projector optical system in accordance with Example 2, illumination light (white light) from the light source lamp 12 is reflected by the parabolic reflector 11 so as to become substantially parallel light, which is then made incident on the integrator optical system 20A.

The integrator optical system 20A comprises first and second lenses 23, 24 for converging the illumination light from the light source unit 10; a rod integrator 27 for homogenizing the luminous flux from the light source unit 10; and third and fourth lenses 25, 26 for diverging the luminous flux transmitted through the rod integrator 27 and causing thus transmitted luminous flux into substantially parallel light. The rod integrator 27 mixes pencils of rays incident on its entrance end face at various angles while totally reflecting them so as to guide them in the direction of optical axis X, thereby homogenizing the light quantity distribution at the exit end face. The luminous flux homogenized by the integrator optical system 20A is made incident on the polarization converter 30.

The polarization converter 30 is constituted by a polarization converting member in which an optical device having a polarization separating surface is combined with a polarization direction rotating device (not depicted), and is adapted to arrange the illumination light from the light source unit 10 into S-polarized light. The illumination light arranged into S-polarized light by the polarization converter 30 is reflected by the mirror 43 into a substantially perpendicular direction, and is guided to the polarization separating prism 50 by a pair of condenser lenses 41, 42.

The polarization separating prism 50 has substantially the same configuration as that of Example 1 except that the polarization separating surface 51 is set such that the illumination light and projection light are substantially perpendicular to each other. Namely, as shown in FIG. 4, the polarization separating prism 50 of Example 2 has the polarization separating surface 51, whereas incident S-polarized light is reflected by the polarization separating surface 51, so as to be made incident on the DMD 70 by way of the quarter-wave plate 60. This light is modulated by the DMD 70 such that a predetermined light component to become projection light is reflected substantially perpendicular to the illumination light. Thus modulated light is transmitted through the quarter-wave plate 60 again, so as to be converted into P-polarized light and then is made incident on the polarization separating prism 50. Thereafter, the modulated light turned into P-polarized light under the action of the quarter-wave plate 60 is transmitted through the polarization separating surface 51, whereby the P-polarized light carrying desirable video information is made incident on the projection optical system 80, so as to be projected onto a screen (not depicted).

Thus, in the projector optical system of Example 2, the illumination light emitted from the light source unit 10 along the optical axis X is homogenized in terms of the light quantity distribution within a luminous flux cross section by the integrator optical system 20A, and is turned into S-polarized light by the polarization converter 30. Thereafter, this S-polarized light is reflected by the mirror 43 and then is converged by the condenser lenses 41, 42. Subsequently, thus converged light is reflected by the polarization separating surface 51 of the polarization separating prism 50 and is made incident on the DMD 70 with the polarization direction being rotated by 90° by the quarter-wave plate 60. In the DMD 70, each mirror element selectively reflects the illumination light into any of first and second directions, thereby causing the light to carry video information. The resulting modulated light is transmitted through the quarter-wave plate 60 again, so as to rotate the polarization direction by 90°, thereby being converted into P-polarized light, which is then made incident on the polarization separating prism 50. In the polarization separating prism 50, since the P-polarized light is transmitted through the polarization separating surface 51 as mentioned above, the modulated light carrying the predetermined video information enters the projection optical system 80, so as to be projected onto a screen (not depicted).

Therefore, the projector optical system of Example 2, as with that of Example 1, can make the F number of illumination optical system without changing the rotational angle of minute mirror elements in the DMD 70, and can make the apparatus compact since the illumination light and the projection light are substantially perpendicular to each other.

EXAMPLE 3

Figure 5:
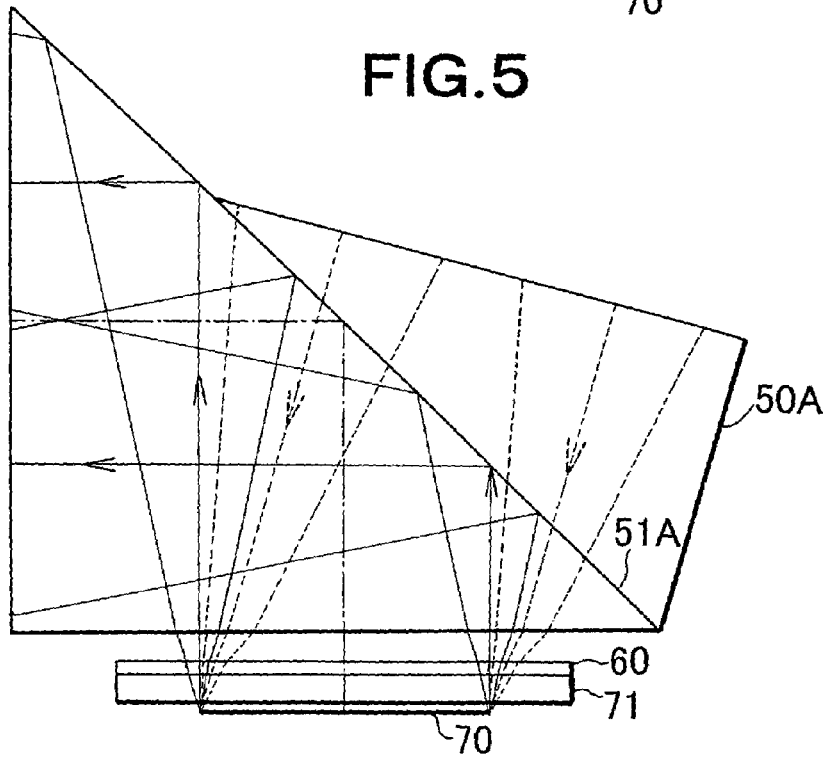
FIG. 5 is a view showing a major part of a projector optical system in accordance with Example 3 of the present invention.
Figure 6:
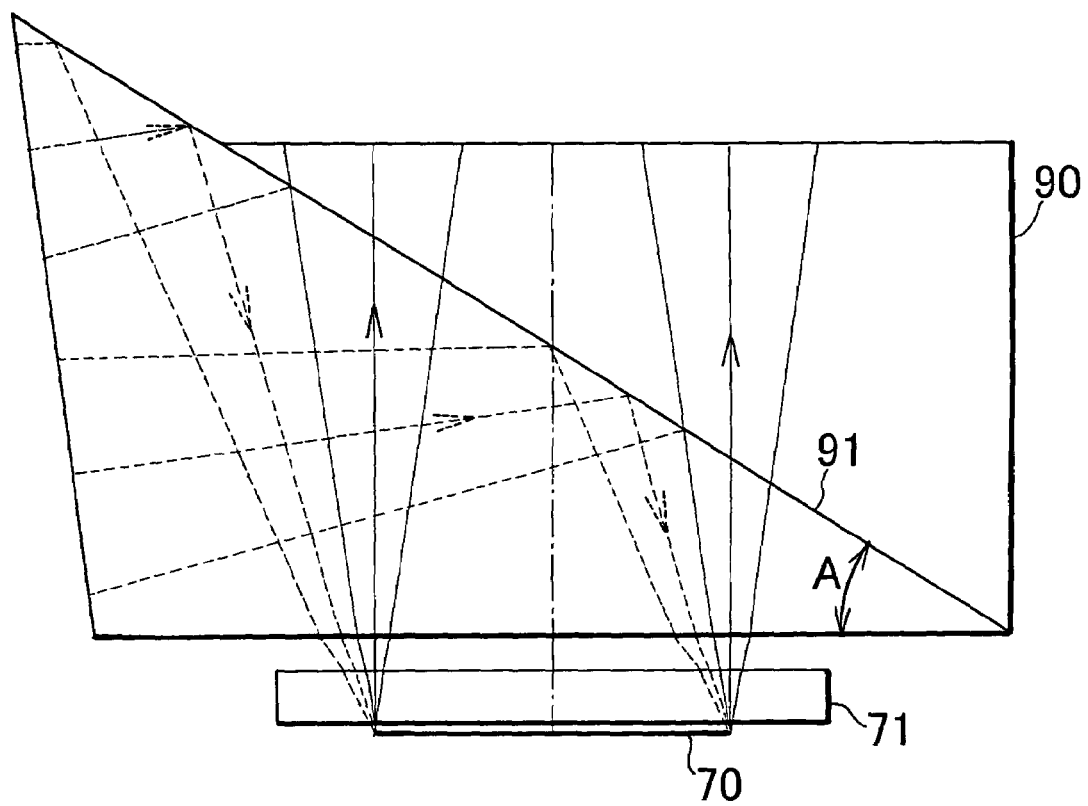
FIG. 6 is a view showing the configuration of a major part of a conventional projector optical system for separating an illumination luminous flux and a projection luminous flux from each other by using a total reflection prism.
Figure 7:
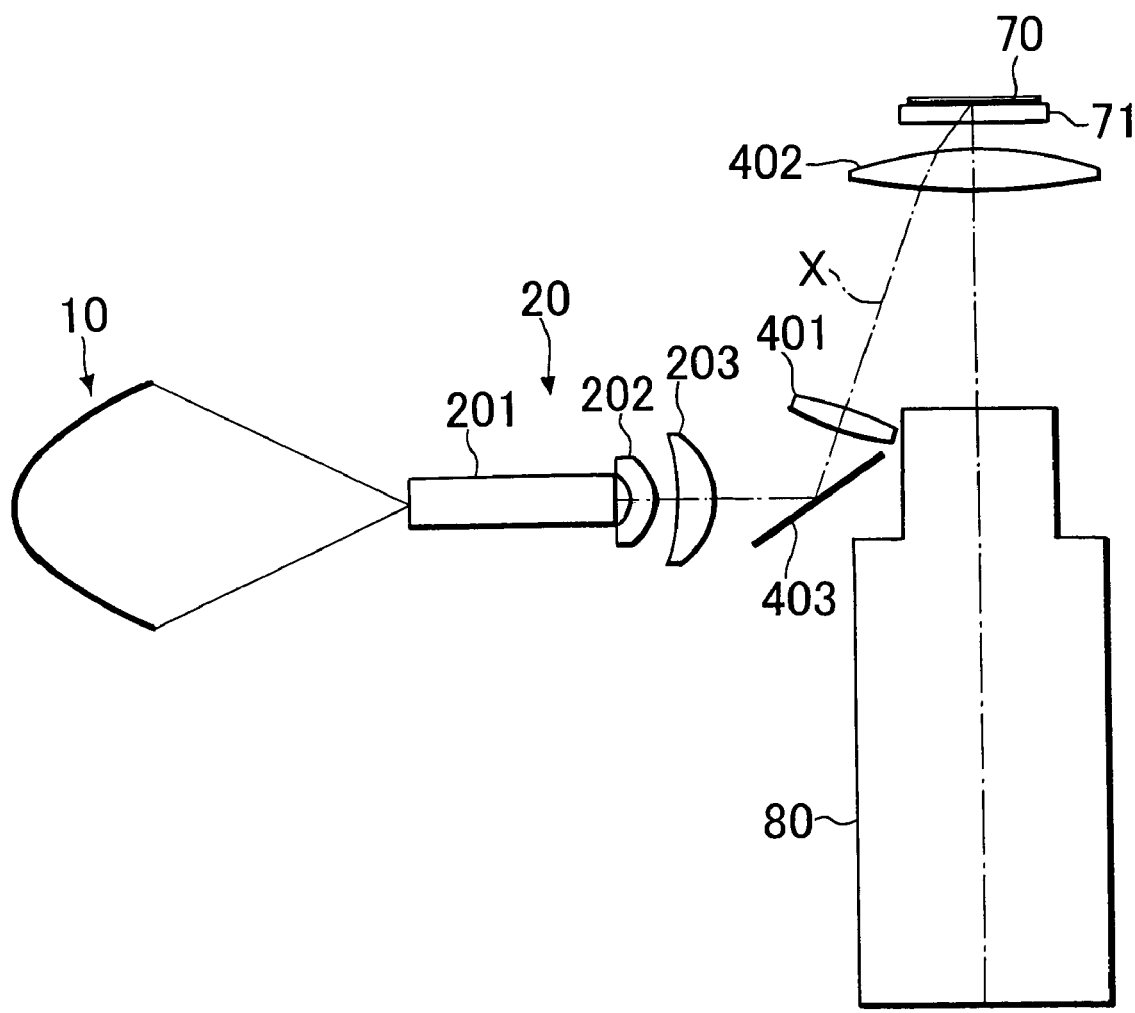
FIG. 7 is a sectional view showing the configuration of a conventional projector optical system for separating an illumination luminous flux and a projection luminous flux from each other at a pupil position of a projection optical system.

FIG. 5 is a view showing a major part of the projector optical system in accordance with Example 3 of the present invention.

The projector optical system in accordance with Example 3 of the present invention has substantially the same configuration as that of Example 1 except for the kinds of polarization of luminous fluxes incident on and emitted from the DMD 70.

Namely, as shown in FIG. 5, the luminous fluxes incident on and emitted from the DMD 70 in the polarization separating prism 50A of the projector optical system in accordance with Example 3 are opposite from those in Example 1. Also, in the projector optical system in accordance with Example 3, the illumination luminous flux from the light source unit is turned into P-polarized light by the polarization converter.

In the projector optical system in accordance with Example 3, the illumination luminous flux turned into P-polarized light is made incident on the polarization separating prism 50A. The illumination luminous flux is transmitted through the polarization separating surface 51A and then is made incident on the DMD 70 with the polarization direction being rotated by 90° by the quarter-wave plate 60. In the DMD 70, each mirror element selectively reflects the illumination light into any of first and second directions, thereby causing the light to carry video information. The resulting modulated light is transmitted through the quarter-wave plate 60 again, so as to rotate the polarization direction by 90°, thereby being converted into S-polarized light, which is then made incident on the polarization separating prism 50A. In the polarization separating prism 50A, the polarization separating surface 51A transmits therethrough the P-polarized light but reflects the S-polarized light, whereby the modulated light carrying the desirable video information is made incident on the projection optical system 80, so as to be projected onto a screen (not depicted).

In FIG. 5, broken lines indicate the P-polarized light incident on the polarization separating prism 50A and transmitted through the polarization separating surface 51A so as to reach the DMD 70, whereas solid lines indicate the S-polarized light modulated by the DMD 70 and reflected by the polarization separating surface 51 so as to reach the projection optical system 80.

Projector Apparatus

The projector apparatus in accordance with the present invention can be constructed by using the projector optical system in accordance with Examples 1 to 3 mentioned above, and is suitable for presentations using personal computers and for projecting pictures from DVD players and the like onto large screens in particular.

The projector optical system in accordance with the present invention and the projector apparatus using the same can modify those of the above-mentioned embodiments in various manners. For example, though the above-mentioned embodiments use prism members as the luminous flux separating means, they are not restrictive. For example, planar members may also be used as luminous flux separating means.

As explained in the foregoing, the projector optical system of the present invention and the projector apparatus using the same can lower the effective F number of the illumination optical system without changing the rotational angle of mirror elements constituting the digital micromirror device, so as to yield a bright optical system. Also, directions of illumination and projection luminous fluxes can be set arbitrarily, which contributes to making the apparatus compact.

When the projection optical system is configured as an optical system telecentric on the reducing magnification side, color and light quantity can be prevented from becoming uneven.

What is claimed is:

1. A projector optical system comprising:
    a digital micromirror device for modulating illumination light, the digital micromirror device including minute mirror elements with variable light-reflecting directions, the minute mirror elements being arranged regularly within a plane so as to correspond to respective pixels of an image, each minute mirror element switching, according to a video signal fed therein, between two states having respective angles of rotation different from each other so as to selectively reflect the illumination light into one of first and second directions;

an illumination optical system for outputting a luminous flux having a uniform polarization direction incident on a polarization separating surface of a polarization separating means;

a projection optical system for projecting onto a predetermined projection surface illumination light modulated by the digital micromirror device and emitted in the first direction; and wherein the polarization separating means for making light from the illumination optical system incident on the digital micromirror device and guides to the projection optical system the illumination light modulated by the digital micromirror device and emitted in the first direction;

wherein the polarization separating means has a polarization separating surface for separating a luminous flux incident on the digital micromirror device and modulated luminous flux emitted from the digital micromirror device from each other;

wherein an angle between the light which is incident on the digital micromirror device from the illumination optical system and the illumination light modulated by the digital micromirror device and emitted in the first direction is set according to an F number of the illumination optical system; and wherein a polarization direction rotating means for rotating a polarization direction is disposed between the polarization separating surface and the digital micromirror device.

2. A projector optical system according to claim 1, wherein the luminous flux separating means is a prism member.

3. A projector optical system according to claim 1, wherein the polarization direction rotating means comprises a quarter-wave plate.

4. A projector optical system according to claim 1, wherein the projection optical system is an optical system telecentric on a reducing magnification side.

5. A projector optical system according to claim 1, wherein the polarization separating surface reflects S-polarized light incident thereon from the illumination optical system toward the digital micromirror device and transmits therethrough toward the projection optical system P-polarized light outputted from the polarization direction rotating means after being reflected in the first direction by the digital micromirror device.

6. A projector apparatus comprising the projector optical system according to claim 1.

* * * * *